United States Patent
Davydov et al.

(10) Patent No.: US 10,645,624 B2
(45) Date of Patent: *May 5, 2020

(54) CHANNEL QUALITY INFORMATION FEEDBACK TECHNIQUES

(71) Applicant: INTEL CORPORATION, Santa Clara, CA (US)

(72) Inventors: Alexei Davydov, Nizhny Novgorod (RU); SeungHee Han, San Jose, CA (US); Yuan Zhu, Beijing (CN); Xiaogang Chen, Portland, OR (US); Alexander Maltsev, Nizhny Novgorod (RU); Gregory Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/990,643

(22) Filed: May 27, 2018

(65) Prior Publication Data

US 2019/0007878 A1 Jan. 3, 2019

Related U.S. Application Data

(63) Continuation of application No. 14/411,499, filed as application No. PCT/US2013/077517 on Dec. 23, 2013, now Pat. No. 9,986,477.

(Continued)

(51) Int. Cl.
*H04W 36/14* (2009.01)
*H04W 12/02* (2009.01)
(Continued)

(52) U.S. Cl.
CPC ............ *H04W 36/14* (2013.01); *H04B 7/024* (2013.01); *H04B 7/0486* (2013.01);
(Continued)

(58) Field of Classification Search
CPC ..... H04W 88/08; H04W 24/10; H04W 36/14; H04W 56/005; H04W 56/0015;
(Continued)

(56) References Cited

U.S. PATENT DOCUMENTS 9,264,120 B2 * 2/2016 Jongren ................ H04L 1/0026
2013/0083719 A1 * 4/2013 Seo ........................ H04L 5/0057
370/312

(Continued)

FOREIGN PATENT DOCUMENTS

CA 2827075 A1 10/2012
JP 2012515472 A 7/2012
(Continued)

OTHER PUBLICATIONS

3GPP TS 36.213 V11.1.0 (Dec. 2012), pp. 73-78, uploaded on Dec. 20, 2012, URL: http://www.3gpp.org/ftp/Specs/archive/36_series/36.213/36213-b10.zip (newly cited document).

(Continued)

*Primary Examiner* — Faruk Hamza
*Assistant Examiner* — Jean F Voltaire
(74) *Attorney, Agent, or Firm* — Eschweiler & Potashnik, LLC

(57) ABSTRACT

Various embodiments are generally directed to improved channel quality information feedback techniques. In one embodiment, for example, an evolved node B (eNB) may comprise a processor circuit, a communication component for execution by the processor circuit to receive a channel quality index for a physical downlink shared channel (PDSCH), the channel quality index associated with a defined reference resource, and a selection component for execution by the processor circuit to select a modulation and coding scheme (MCS) for transmission over the PDSCH of user equipment (UE) data in one or more resource blocks, (Continued)

the selection component to compensate for a difference between a cell-specific reference signal (CRS) overhead of the defined reference resource and a CRS overhead of the one or more resource blocks when selecting the MCS. Other embodiments are described and claimed.

25 Claims, 8 Drawing Sheets

Related U.S. Application Data

(60) Provisional application No. 61/748,706, filed on Jan. 3, 2013.

(51) Int. Cl.
| | |
|---|---|
| *H04L 1/00* | (2006.01) |
| *H04W 76/14* | (2018.01) |
| *H04W 76/11* | (2018.01) |
| *H04W 76/10* | (2018.01) |
| *H04B 7/024* | (2017.01) |
| *H04B 7/0456* | (2017.01) |
| *H04B 7/06* | (2006.01) |
| *H04J 11/00* | (2006.01) |
| *H04L 5/00* | (2006.01) |
| *H04L 12/46* | (2006.01) |
| *H04L 29/12* | (2006.01) |
| *H04L 29/06* | (2006.01) |
| *H04W 24/10* | (2009.01) |
| *H04W 28/02* | (2009.01) |
| *H04W 36/00* | (2009.01) |
| *H04W 36/22* | (2009.01) |
| *H04W 48/08* | (2009.01) |
| *H04W 48/16* | (2009.01) |
| *H04W 52/02* | (2009.01) |
| *H04W 56/00* | (2009.01) |
| *H04W 68/00* | (2009.01) |
| *H04W 72/00* | (2009.01) |
| *H04W 72/04* | (2009.01) |
| *H04W 88/08* | (2009.01) |
| *H04W 88/06* | (2009.01) |
| *H04W 8/08* | (2009.01) |
| *H04W 84/12* | (2009.01) |
| *H04W 88/16* | (2009.01) |

(52) U.S. Cl.
CPC ......... *H04B 7/0626* (2013.01); *H04B 7/0632* (2013.01); *H04J 11/0053* (2013.01); *H04L 1/0026* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/10* (2018.02); *H04W 76/11* (2018.02); *H04W 76/14* (2018.02); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01)

(58) Field of Classification Search
CPC ............ H04W 72/005; H04W 72/0413; H04L 61/2007; H04L 12/4641; H04L 63/306; H04D 70/00; H04D 70/22; H04D 70/21; H04D 70/162
USPC .......................................................... 370/329
See application file for complete search history.

(56) References Cited

U.S. PATENT DOCUMENTS

| | | | | |
|---|---|---|---|---|
| 2013/0235807 | A1* | 9/2013 | Lee ........................ | H04W 16/28 370/329 |
| 2013/0301448 | A1* | 11/2013 | Sayana ................ | H04W 24/10 370/252 |
| 2014/0126402 | A1* | 5/2014 | Nam ..................... | H04W 24/08 370/252 |
| 2014/0192917 | A1* | 7/2014 | Nam ..................... | H04L 1/0026 375/267 |
| 2014/0301238 | A1* | 10/2014 | Chun .................... | H04L 5/0048 370/252 |
| 2015/0163039 | A1 | 6/2015 | Davydov et al. | |
| 2015/0181567 | A1* | 6/2015 | Skov .................... | H04W 24/10 370/329 |

FOREIGN PATENT DOCUMENTS

| | | |
|---|---|---|
| KR | 20110084594 A | 7/2011 |
| WO | 2011018121 A2 | 2/2011 |
| WO | 2011087272 A2 | 7/2011 |
| WO | 2014107371 A1 | 7/2014 |

OTHER PUBLICATIONS

LG Electronics, TBS determination for PDSCH scheduled by EPDCCH, 3GPP TSG RAN WG1 Meeting #70bis, R1-124331, Uploaded on Sep. 29, 2012, URL: https://www.3gpp.org/ftp/tsg_ran/WG1_RL1/TSGR1_70b/Docs/R1-124331.zip (newly cited document).

* cited by examiner

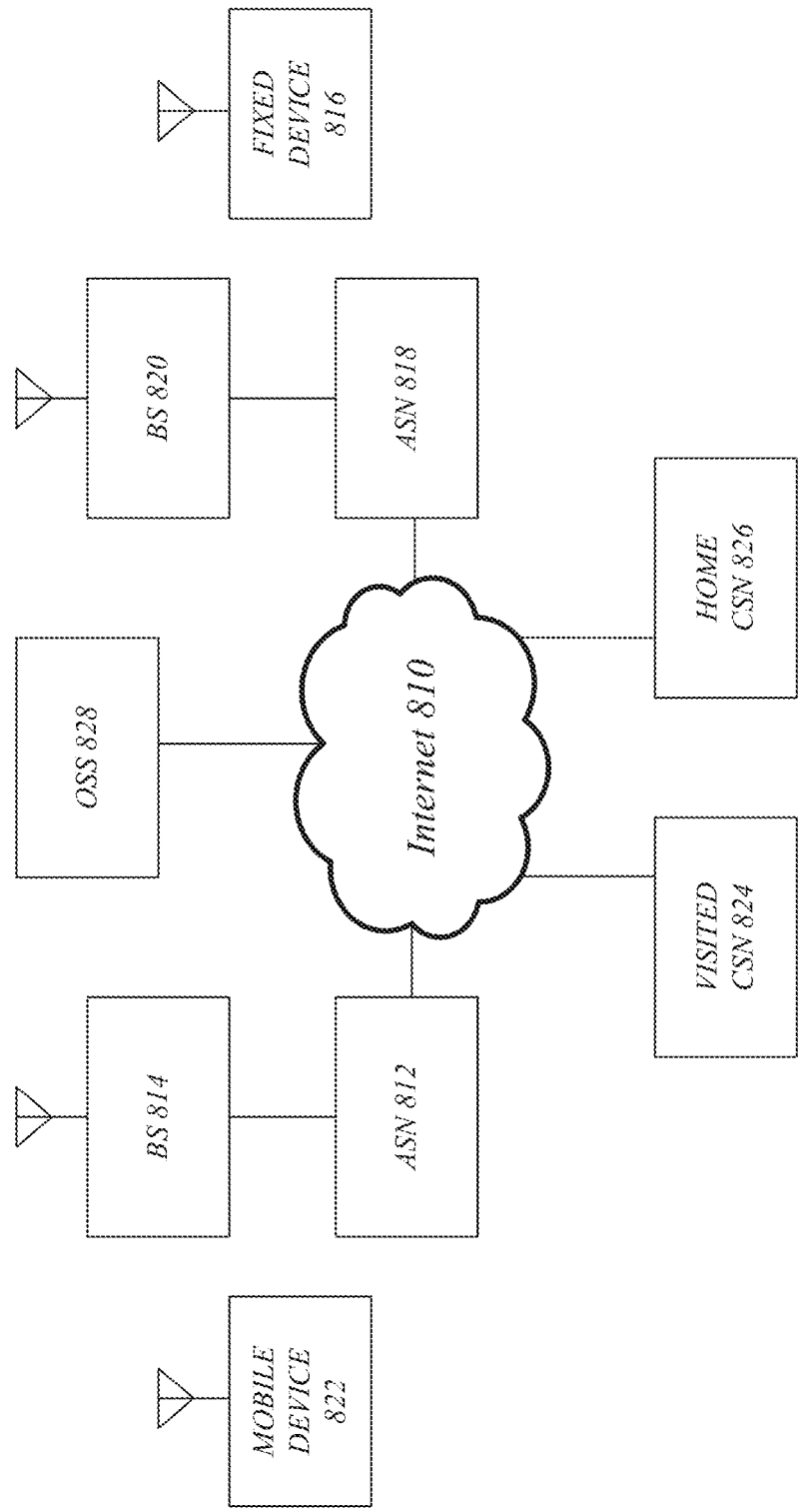

CHANNEL QUALITY INFORMATION FEEDBACK TECHNIQUES

RELATED CASE

This application is a continuation of, claims the benefit of and priority to previously filed U.S. patent application Ser. No. 14/411,499 filed Dec. 27, 2014, entitled "CHANNEL QUALITY INFORMATION FEEDBACK TECHNIQUES," which is a national stage entry of International Patent Application Number PCT/US2013/077517 filed Dec. 23, 2013, which claims priority to U.S. Provisional Patent Application No. 61/748,706, filed Jan. 3, 2013. All of the above are hereby incorporated by reference in their entirety.

TECHNICAL FIELD

Embodiments herein generally relate to wireless mobile broadband communications.

BACKGROUND

In a wireless radio access network such as an evolved universal mobile telecommunications system (UMTS) terrestrial radio access network (E-UTRAN), channel quality feedback techniques may be implemented in order to enable evolved node Bs (eNBs) to use suitable modulation and coding schemes (MCSs) when sending messages to user equipment (UEs). According to some such techniques, UEs may periodically and/or aperiodically transmit channel quality indicator (CQI) indices to their serving eNBs. Each CQI index may indicate an MCS that its UE expects to be suitable for use in prospective transmission of a message from an eNB to that UE during a particular subframe.

In some cases, each transmitted message may be transmitted as one or more resource elements (REs) within one or more resource blocks, and the MCS that is actually most suitable for transmitting a particular message may depend on the structures the resource blocks that contain it. Since the UEs cannot know the actual structures of such resource blocks until after they are received, the UEs may define channel state information (CSI) reference resources based on which to select CQI indices. Each CSI reference resource may comprise a generic expected structure for resource blocks via which its associated UE may expect to receive a prospective message during a particular subframe. Once it defines a CSI reference resource for a given subframe, a UE may select a CQI index for that subframe based on the CSI reference resource.

In some wireless radio access networks, the use of particular features may affect the structures of the resource blocks that carry messages to UEs. For example, when an enhanced physical downlink control channel (EPDCCH) is implemented within a physical downlink shared channel (PDSCH) of a E-UTRAN, some REs within PDSCH resource blocks may be allocated to the EPDCCH. In another example, for any particular PDSCH resource block, the number of REs that contain cell-specific reference signals (CRSs) may depend on a number of CRS antenna ports that are configured for the eNB transmitting that PDSCH resource block. In order to enable proper MCS selection, it may be desirable to account for such effects in conjunction with CQI index reporting and/or interpretation, either by incorporating them into the definition of the CSI reference resource on the UE side or by compensating for them on the eNB side.

BRIEF DESCRIPTION OF THE DRAWINGS

FIG. 8 illustrates one embodiment of a communications system.

DETAILED DESCRIPTION

Figure 1:
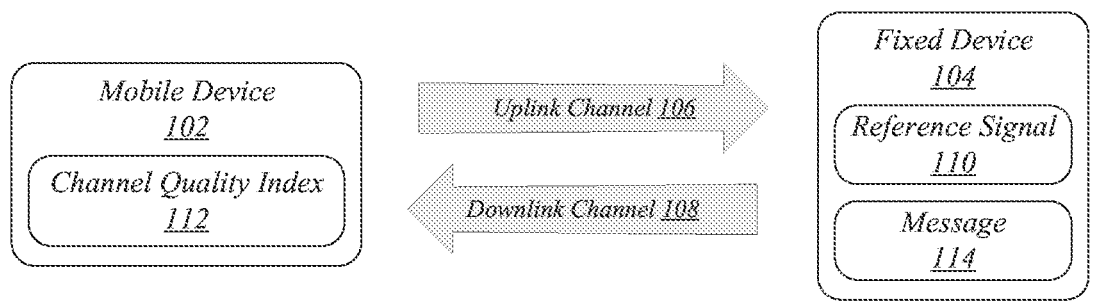
FIG. 1 illustrates one embodiment of an operating environment.

Various embodiments are generally directed to improved channel quality information feedback techniques. In one embodiment, for example, an evolved node B (eNB) may comprise a processor circuit, a communication component for execution by the processor circuit to receive a channel quality index for a physical downlink shared channel (PDSCH), the channel quality index associated with a defined reference resource, and a selection component for execution by the processor circuit to select a modulation and coding scheme (MCS) for transmission over the PDSCH of user equipment (UE) data in one or more resource blocks, the selection component to compensate for a difference between a cell-specific reference signal (CRS) overhead of the defined reference resource and a CRS overhead of the one or more resource blocks when selecting the MCS. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. More particularly, various embodiments may involve transmissions over one or more wireless connections according to technologies and/or standards comprised in 3GPP Release 11, initially released Q3 2012, including their revisions, progeny and variants. Hereinafter, such embodiments shall be referred to as "3GPP Rel-11" embodiments.

Some embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants. Examples of wireless mobile broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of an operating environment 100 that may be representative of various embodiments. As shown in FIG. 1, a mobile device 102 communicates with a fixed device 104 via an uplink channel 106 and a downlink channel 108. In some 3GPP Rel-11 embodiments, mobile device 102 may comprise user equipment (a UE), fixed device 104 may comprise an evolved Node B (eNB), uplink channel 106 may comprise a physical uplink shared channel (PUSCH) or a physical uplink control channel (PUCCH), and downlink channel 108 may comprise a physical downlink shared channel (PDSCH). The embodiments are not limited in this context.

In order to determine parameters, such as a modulation and coding scheme, for use in transmission of data to mobile device 102 via downlink channel 108, fixed device 104 may transmit a reference signal 110 to mobile device 102 via downlink channel 108. Mobile device 102 may perform channel estimation for downlink channel 108 based on reference signal 110, select a channel quality index 112 based on the channel estimation, and send the channel quality index 112 to fixed device 104 via uplink channel 106. Fixed device 104 may then apply parameters defined by channel quality index 112 to transmit message 114 to mobile device 102 via downlink channel 108. In various 3GPP Rel-11 embodiments, reference signal 110 may comprise one or more resource elements (REs) within one or more resource blocks, and channel quality index 112 may comprise a channel quality indicator (CQI) index. The embodiments are not limited in this context.

In some embodiments, mobile device 102 may define a reference resource comprising a generic expected structure of resource blocks via which it may receive message 114. Based on the quality with which it receives reference signal 110 via downlink channel 108, mobile device 102 may then select a channel quality index 112 that defines transmission parameters that mobile device 102 estimates will yield a particular level of received quality for data hypothetically transmitted from fixed device 104 to mobile device 102 within the reference resource. For example, mobile device 102 may select a channel quality index 112 that indicates a most efficient modulation and coding scheme via which it estimates it could receive data within the reference resource over downlink channel 108 with a transport block error probability of no greater than 10%. In various 3GPP Rel-11 embodiments, the reference resource may comprise a channel state information (CSI) reference resource. The embodiments are not limited in this context.

In some embodiments, the quality with which mobile device 102 might expect to receive data within the reference resource may depend on the structure of the reference resource, and thus the selection of channel quality index 112 may depend on the structure of the reference resource. For example, in various embodiments, the received quality level that mobile device 102 estimates may depend on how many REs in the reference resource are assumed to comprise data intended for mobile device 102 and how many REs are assumed to comprise data associated with various types of overhead. In some embodiments, mobile device 102 may therefore be operative to select channel quality index 112 based in part on a number of resource elements (REs) in the reference resource that are assumed to contain data intended for mobile device 102. In various embodiments, the selection of channel quality index 112 may additionally or alternatively depend on one or more assumptions regarding the transmission origin of the reference resource. For example, in some embodiments, mobile device 102 may be operative to select channel quality index 112 based in part on an assumption that the reference resource is transmitted from a same location as that from which fixed device 104 transmitted reference signal 110, rather than from another location and/or fixed device. The embodiments are not limited in this context.

In various embodiments, if the structures of the resource blocks containing message 114 and/or their transmission origins differ materially from the assumptions associated with the reference resource, the selected channel quality index 112 may not define transmission parameters that are suitable for transmission of message 114 to mobile device 102. For example, if message 114 comprises a different number of REs containing data intended for mobile device 102 than the number assumed with respect to the reference resource, the selected channel quality index 112 may not be suitable for transmission of message 114. In another example, if it has been assumed that the reference resource is transmitted from a same location as was reference signal 110 but then message 114 is contained in resource blocks transmitted from a different location than was reference signal 110, the selected channel quality index 112 may not be suitable for transmission of message 114. The embodiments are not limited to this example.

In some embodiments, the use of particular features may affect the structures, transmission origins, and/or other characteristics of downlink channel resource blocks. For example, in various embodiments, a downlink control channel implemented within downlink channel 108 may occupy REs within resource blocks of downlink channel 108. In another example, in some embodiments, some downlink channel resource block REs may be allocated for one or more cell-specific reference signals (CRSs) corresponding to one or more CRS antenna ports of fixed device 104. In order to enable the proper selection of transmission parameters such as an MCS for message 114, it may be desirable to account for such effects in conjunction with the selection of channel quality index 112 at mobile device 102 and/or the interpretation of channel quality index 112 at fixed device 104.

Disclosed herein are improved channel quality information feedback techniques that may enable the selection of suitable transmission parameters by accounting for one or more features affecting the structures, transmission origins, and/or other characteristics of downlink channel resource blocks. In various embodiments, such accounting may be performed on the mobile device side, where the reference resource may be defined to account for such features. In some embodiments, such accounting may alternatively or additionally be performed on the fixed device side, where compensation for such features may be performed during transmission parameter selection. The embodiments are not limited in this context.

Figure 2:
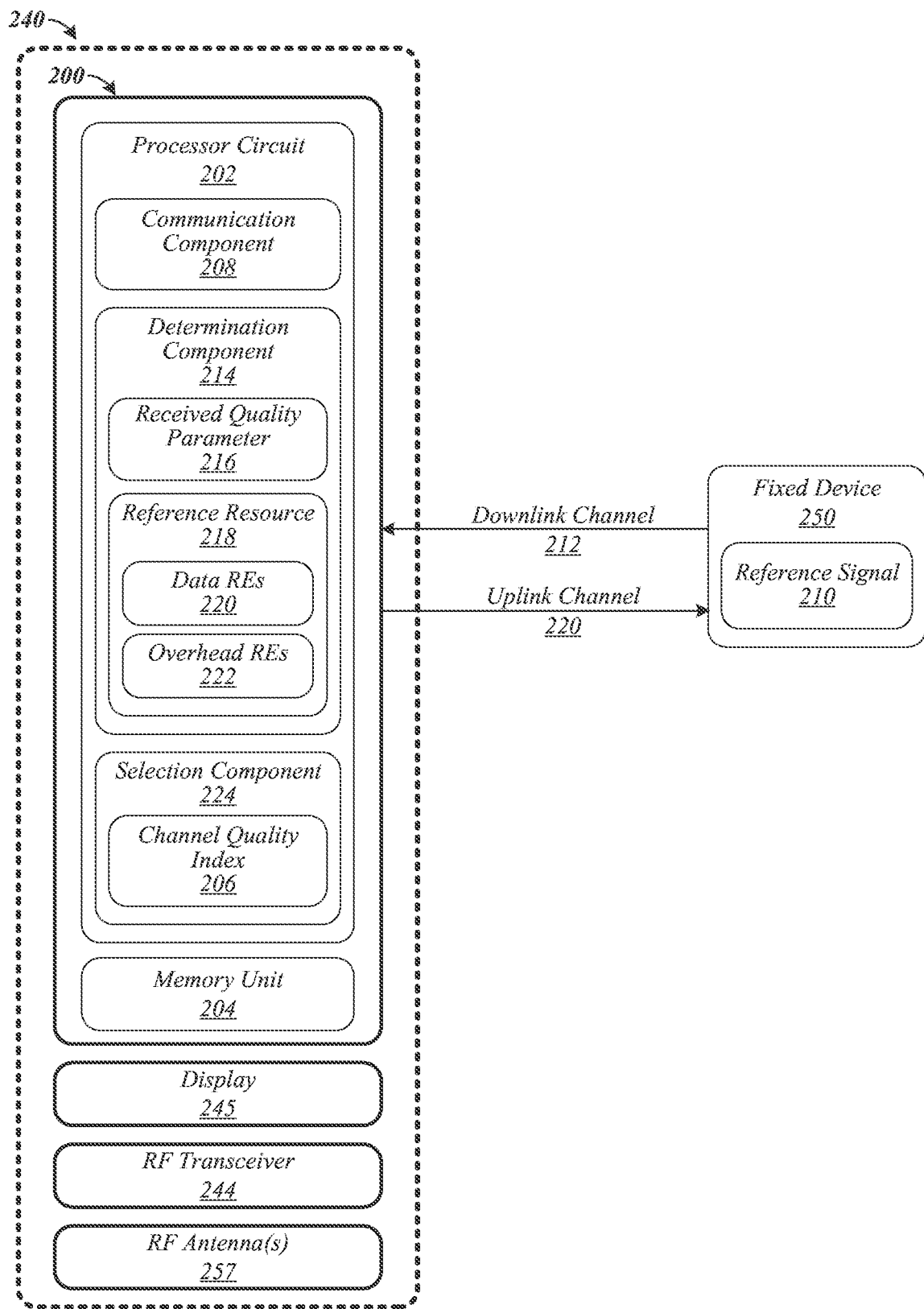
FIG. 2 illustrates one embodiment of a first apparatus and one embodiment of a first system.

FIG. 2 illustrates a block diagram of an apparatus 200, which may comprise an example of mobile device 102 of FIG. 1 in various embodiments. More particularly, apparatus 200 comprises an example of a mobile device that may be configured to define a reference resource such as to account for features affecting the structures of downlink channel resource blocks. In some 3GPP Rel-11 embodiments, apparatus 200 may comprise a UE. As shown in FIG. 2, apparatus 200 comprises multiple elements including a processor circuit 202 and a memory unit 204. However, the embodiments are not limited to the type, number, or arrangement of elements shown in FIG. 2.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

FIG. 2 also illustrates a block diagram of a system 240. System 240 may comprise any of the aforementioned elements of apparatus 200. System 240 may further comprise one or more additional components. For example, in various embodiments, system 240 may comprise a radio frequency (RF) transceiver 244. RF transceiver 244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 244 may operate in accordance with one or more applicable standards in any version. The embodiments are not limited in this context.

In some embodiments, system 240 may comprise one or more RF antennas 257. Examples of any particular RF antenna 257 may include an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. The embodiments are not limited to these examples.

In various embodiments, system 240 may include a display 245. Display 245 may comprise any display device capable of displaying information received from processor circuit 202. Examples for display 245 may include a television, a monitor, a projector, and a computer screen. In one embodiment, for example, display 245 may be implemented by a liquid crystal display (LCD), light emitting diode (LED) or other type of suitable visual interface. Display 245 may comprise, for example, a touch-sensitive display screen ("touchscreen"). In various implementations, display 245 may comprise one or more thin-film transistors (TFT) LCD including embedded transistors. The embodiments are not limited in this context.

In general operation, apparatus 200 and/or system 240 may be operative to select a channel quality index 206 for transmission to a fixed device 250. In various embodiments, channel quality index 206 may comprise information indicating and/or corresponding to one or more transmission parameters for use by fixed device 250 in transmitting data to apparatus 200 and/or system 240. For example, in some embodiments, channel quality index 206 may comprise an index number corresponding to a modulation and coding scheme to be used by fixed device 250. In various 3GPP Rel-11 embodiments, the channel quality index 206 may comprise a channel quality indicator (CQI) index. The embodiments are not limited in this context.

In some embodiments, apparatus 200 and/or system 240 may comprise a communication component 208. Communication component 208 may comprise logic, circuitry, and/or instructions operative to send messages to fixed device 250 and/or to receive messages from fixed device 250. In various embodiments, communication component 208 may be operative to send and/or receive messages via RF transceiver 244 and one or more RF antennas 257. In some embodiments, communication component 208 may be operative to generate and/or process messages according to one or more wireless communications standards. For example, in various 3GPP Rel-11 embodiments, communication component 208 may be operative to generate and/or process messages according to one or more 3GPP specifications. The embodiments are not limited in this context.

In various embodiments, communication component 208 may be operative to receive a reference signal 210 from fixed device 250. In some embodiments, reference signal 210 may comprise a signal for use by apparatus 200 and/or system 240 to estimate a quality of a downlink channel 212 from fixed device 250 to apparatus 200 and/or system 240. In various embodiments, reference signal 210 may comprise information in one or more resource elements and/or resource blocks in one or more subframes and/or frames transmitted by fixed device 250 over the downlink channel 212. In some 3GPP Rel-11 embodiments, reference signal 210 may comprise a channel state information reference signal (CSI-RS) and a channel state information interference measurement (CSI-IM) resource. In various embodiments, the downlink channel 212 may comprise a shared channel. For example, in some 3GPP Rel-11 embodiments, the downlink channel 212 may comprise a PDSCH. The embodiments are not limited in this context.

In various embodiments, apparatus 200 and/or system 240 may comprise a determination component 214. Determination component 214 may comprise logic, circuitry, and/or instructions operative to determine a received quality parameter 216 for reference signal 210. In some embodiments, received quality parameter 216 may comprise an estimated channel quality for downlink channel 212. In various embodiments, determination component 214 may be operative to determine received quality parameter 216 based on the powers with which it receives various resource elements of reference signal 210. In some 3GPP Rel-11 embodiments, received quality parameter 216 may comprise channel measurements for a CSI-RS and interference measurements for a CSI-IM resource. The embodiments are not limited in this context.

In various embodiments, determination component 214 may be operative to define a reference resource 218 for downlink channel 212. Reference resource 218 may comprise a generic expected structure of resource blocks via which apparatus 200 and/or system 240 may prospectively receive a message over downlink channel 212. In some 3GPP Rel-11 embodiments, reference resource 218 may comprise a CSI reference resource. In various embodiments, determination component 214 may be operative to define reference resource 218 to contain data REs 220 and overhead REs 222. Data REs 220 may comprise REs of reference resource 218 that are defined as being allocated for use in conveying the message prospectively transmitted via reference resource 218, while overhead REs 222 may comprise REs allocated for use in implementing various wireless network features. In some embodiments, the number of data REs 220 in reference resource 218 may depend on the number of overhead REs 222 in reference resource 218. In various embodiments, determination component 214 may be operative to define reference resource 218 by allocating all overhead REs 222 required by any configured wireless network features and then designating the remaining available REs in reference resource 218 as data REs 220. The embodiments are not limited in this context.

In some embodiments, determination component 214 may be operative to define reference resource 218 to include one or more overhead REs 222 allocated to a downlink control channel implemented within downlink channel 212. In various 3GPP Rel-11 embodiments, the downlink control channel may comprise an enhanced physical downlink control channel (EPDCCH). In some 3GPP Rel-11 embodiments, apparatus 200 and/or system 240 may comprise a UE configured with one or both of a EPDCCH physical resource block (PRB) set 0 and an EPDCCH-PRB set 1. In various 3GPP Rel-11 embodiments, determination component 214 may be operative to define reference resource 218 to include one or more overhead REs 222 allocated to EPDCCH-PRB set 0. In some 3GPP Rel-11 embodiments, determination component 214 may be operative to define reference resource 218 to include one or more overhead REs 222 allocated to EPDCCH-PRB set 1. In various 3GPP Rel-11 embodiments, determination component 214 may be operative to define reference resource 218 to include one or more overhead REs 222 allocated to EPDCCH-PRB set 0 and to also include one or more overhead REs 222 allocated to EPDCCH-PRB set 1. The embodiments are not limited in this context.

It is worthy of note that in some embodiments, rather than defining reference resource 218 such as to account for the implementation of a downlink control channel within downlink channel 212, determination component 214 may be operative to define reference resource 218 without regard for whether a downlink control channel is implemented. In various such embodiments, determination component 214 may be operative to define reference resource 218 such that no overhead REs 222 in reference resource 218 are allocated to a downlink control channel. For example, in some 3GPP Rel-11 embodiments, determination component 214 may be operative to define reference resource 218 such that overhead REs 222 do not contain REs comprising EPDCCH overhead. In such embodiments, compensation for the use of the EPDCCH may be performed on the eNB side. The embodiments are not limited in this context.

In various embodiments, determination component 214 may be operative to define reference resource 218 to include one or more overhead REs 222 comprising cell-specific reference signal (CRS) overhead. In some 3GPP Rel-11 embodiments, determination component 214 may be operative to define reference resource 218 in conjunction with a CSI process for apparatus 200 and/or system 240, and the CSI process may be configured with PMI/RI reporting. In various 3GPP Rel-11 embodiments, determination component 214 may be operative to define reference resource 218 to include a number of CRS overhead REs 222 corresponding to a number of CRS antenna ports configured for a serving cell of apparatus 200 and/or system 240. In some 3GPP Rel-11 embodiments, determination component 214 may be operative to define reference resource 218 to include a number of CRS overhead REs 222 corresponding to a number of CRS antenna ports associated with a PDSCH RE mapping and quasi-location indicator (PQI) state with a lowest index value. In various 3GPP Rel-11 embodiments, for any given CSI process, determination component 214 may be operative to define reference resource 218 to include a number of CRS overhead REs 222 corresponding to a number of CRS antenna ports associated with a non-zero power (NZP) CSI-RS for that CSI process. The embodiments are not limited in this context.

In some embodiments, apparatus 200 and/or system 240 may comprise a selection component 224. Selection component 224 may comprise logic, circuitry, and/or instructions operative to select a channel quality index 206 for transmission to fixed device 250. In various embodiments, selection component 224 may be operative to select channel quality index 206 based on received quality parameter 216 and on the reference resource 218 defined by determination component 214. In some embodiments, selection component 224 may be operative to select a channel quality index 206 that indicates a most efficient MCS via which it estimates that a message could be received via reference resource 218 with a particular level of accuracy and/or quality. For example, in various 3GPP Rel-11 embodiments, selection component 224 may be operative to select a channel quality index 206 comprising a CQI index indicating a most efficient MCS via which it estimates that a message could be received via reference resource 218 with a transport block error probability of no greater than 10%. The embodiments are not limited to this example.

In some embodiments, communication component 208 may be operative to send channel quality index 206 to fixed device 250. In various embodiments, communication component 208 may be operative to transmit channel quality index 206 to fixed device 250 over an uplink channel 220. In some 3GPP Rel-11 embodiments, the uplink channel 220 may comprise a PUSCH or PUCCH. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
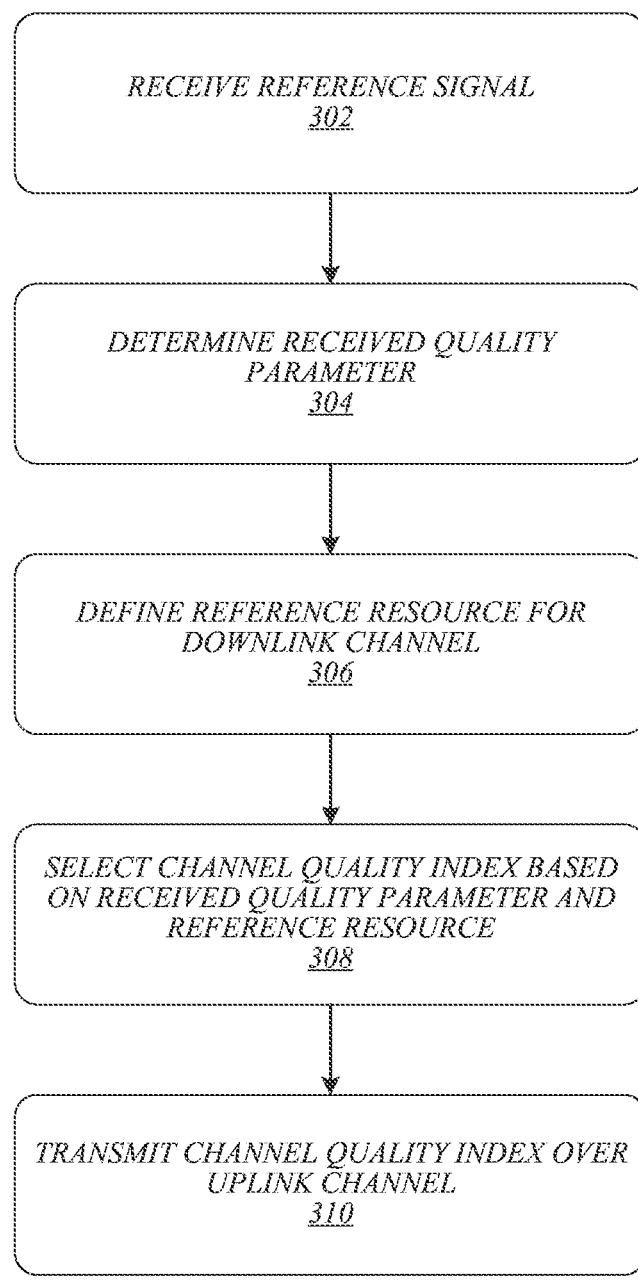
FIG. 3 illustrates one embodiment of a first logic flow.

FIG. 3 illustrates one embodiment of a logic flow 300, which may be representative of the operations executed by one or more embodiments described herein. More particularly, logic flow 300 may comprise an example of operations that apparatus 200 and/or system 240 of FIG. 2 may perform in conjunction with selection of channel quality index 206. As shown in FIG. 3, a reference signal may be received at 302. For example, communication component 208 may be operative to receive reference signal 210 over downlink channel 212. At 304, a received quality parameter may be determined for the reference signal. For example, determination component 214 of FIG. 2 may be operative to determine received quality parameter 216 based on a power with which it receives reference signal 210. At 306, a reference resource may defined for a downlink channel. For example, determination component 214 of FIG. 2 may be operative to define reference resource 218 for downlink channel 212. In various embodiments, the reference resource may be defined to include one or more REs allocated to a downlink control channel implemented within the downlink channel. In some embodiments, the reference resource may be defined to include a set of CRS overhead REs.

At 308, a channel quality index may be selected based on the received quality parameter and the reference resource. For example, selection component 224 of FIG. 2 may be operative to select channel quality index 206 based on received quality parameter 216 and reference resource 218. At 310, the channel quality index may be transmitted over an uplink channel. For example, communication component 208 of FIG. 2 may be operative on RF transceiver 244 to transmit channel quality index 206 over uplink channel 220. The embodiments are not limited to these examples.

Figure 4:
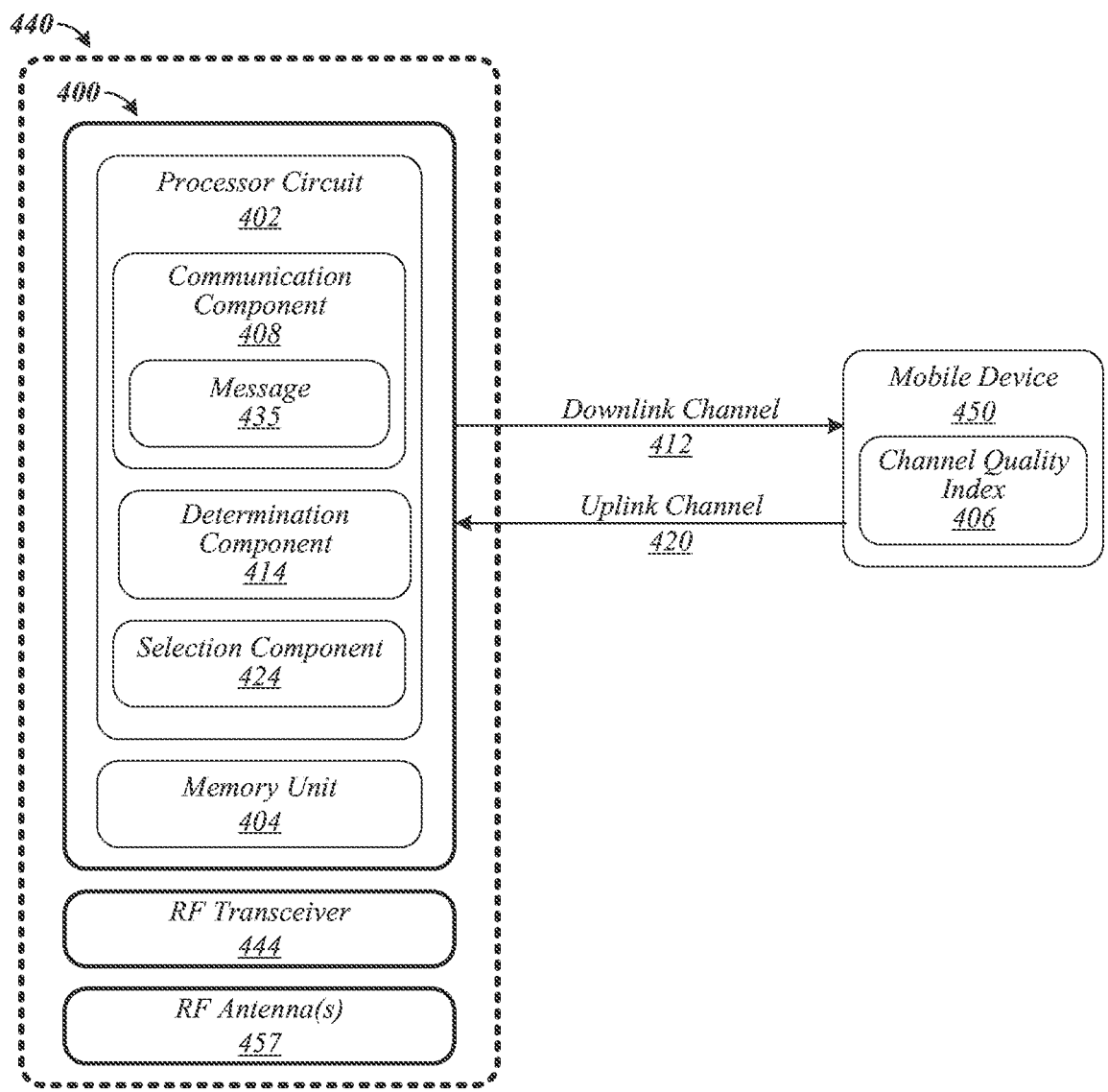
FIG. 4 illustrates one embodiment of a second apparatus and one embodiment of a second system.

FIG. 4 illustrates an embodiment of an apparatus 400, which may comprise an example of fixed device 104 of FIG. 1 and/or fixed device 250 of FIG. 2. More particularly, apparatus 400 may comprise an example of a fixed device that may be configured to select transmission parameters for a downlink channel such as to account for features affecting the structures of resource blocks of the downlink channel. In various 3GPP Rel-11 embodiments, apparatus 400 may comprise an eNB. As shown in FIG. 4, apparatus 400 comprises multiple elements including a processor circuit 402 and a memory unit 404. However, the embodiments are not limited to the type, number, or arrangement of elements shown in FIG. 4.

In some embodiments, apparatus 400 may comprise processor circuit 402. Processor circuit 402 may be implemented using any processor or logic device, and may be the same as or similar to processor circuit 202 of FIG. 2. In various embodiments, apparatus 400 may comprise or be arranged to communicatively couple with a memory unit 404. Memory unit 404 may be implemented using any machine-readable or computer-readable media capable of storing data, including both volatile and non-volatile memory, and may be the same as or similar to memory unit 204 of FIG. 2.

FIG. 4 also illustrates a block diagram of a system 440. System 440 may comprise any of the aforementioned elements of apparatus 400. System 440 may further comprise one or more additional components. For example, in various embodiments, system 440 may comprise a radio frequency (RF) transceiver 444. RF transceiver 444 may include one or more radios capable of transmitting and receiving signals using various suitable wireless communications techniques, and may be the same as or similar to RF transceiver 244 of FIG. 2. In some embodiments, system 440 may comprise one or more RF antennas 457. Examples of any particular RF antenna 457 may include any of the examples previously mentioned with respect to RF antennas 257 of FIG. 2. The embodiments are not limited in this context.

In general operation, apparatus 400 and/or system 440 may be operative to select one or more transmission parameters for use in transmitting a message 435 to a mobile device 450 over a downlink channel 412. In some embodiments, the one or more transmission parameters may comprise a modulation and coding scheme. In various 3GPP Rel-11 embodiments, apparatus 400 and/or system 440 may comprise an eNB, mobile device 450 may comprise a UE, and downlink channel 412 may comprise a PDSCH. In some embodiments, apparatus 400 and/or system 440 may be operative to receive a channel quality index 406 from mobile device 450 and to select the one or more transmission parameters based at least in part on the channel quality index 406. In various 3GPP Rel-11 embodiments, the channel quality index 406 may comprise a CQI index. The embodiments are not limited in this context.

In some embodiments, apparatus 400 and/or system 440 may comprise a communication component 408. Communication component 408 may comprise logic, circuitry, and/or instructions operative to send messages to mobile device 450 and/or to receive messages from mobile device 450. In various embodiments, communication component 408 may be operative to send and/or receive messages via RF transceiver 444 and one or more RF antennas 457. In some embodiments, communication component 408 may be operative to generate and/or process messages according to one or more wireless communications standards. For example, in various 3GPP Rel-11 embodiments, communication component 408 may be operative to generate and/or process messages according to one or more 3GPP specifications. The embodiments are not limited in this context.

In various embodiments, communication component 408 may be operative to receive channel quality index 406 from mobile device 450 over an uplink channel 420. In some 3GPP Rel-11 embodiments, uplink channel 420 may comprise a PUSCH or a PUCCH. In various embodiments, mobile device 450 may define a reference resource and select channel quality index 406 based on the defined reference resource. In some 3GPP Rel-11 embodiments, the reference resource may comprise a CSI reference resource. In various such embodiments, the structure of resource blocks of downlink channel 412 to be used to transmit message 435 may differ from the defined reference resource due to one or more types of overhead. The embodiments are not limited in this context.

In some embodiments, apparatus 400 and/or system 440 may comprise a determination component 414. Determination component 414 may comprise logic, circuitry, and/or instructions operative to determine one or more types of overhead for the resource blocks of downlink channel 412. In various embodiments, the one or more types of overhead may occupy one or more REs in the one or more resource blocks.

In some embodiments, determination component 414 may be operative to determine an overhead corresponding to the implementation of a downlink control channel within downlink channel 412. In various embodiments, determination component 414 may be operative to determine a number of REs in each resource block of downlink channel 412 that are allocated to the downlink control channel In some 3GPP Rel-11 embodiments, the downlink control channel may comprise an enhanced physical downlink control channel (EPDCCH). In various 3GPP Rel-11 embodiments, channel quality index 406 may comprise a CQI index corresponding to a CSI reference resource defined to comprise no EPDCCH overhead. In some 3GPP Rel-11 embodiments, determination component 414 may be operative to determine an EPDCCH overhead corresponding to one or more EPDCCH physical resource block (PRB) sets configured for downlink channel 412. In various 3GPP Rel-11 embodiments, determination component 414 may be operative to determine an EPDCCH overhead corresponding to EPDCCH PRB set 0, to EPDCCH PRB set 1, or both. The embodiments are not limited in this context.

In some embodiments, determination component 414 may be operative to determine a cell-specific reference signal (CRS) overhead for one or more resource blocks of downlink channel 412. In various embodiments, the CRS overhead for the one or more resource blocks of downlink channel 412 may correspond to a number of CRS antenna ports used by apparatus 400 and/or system 440. In some embodiments, the CRS overhead for the one or more resource blocks may differ from a CRS overhead for the reference resource based upon which channel quality index 406 was selected. In various such embodiments, a number of CRS REs in the one or more resource blocks may differ from a number of CRS REs in the reference resource. In some embodiments, the CRS overhead for the reference resource may comprise a number of REs corresponding to a number of CRS antenna ports configured for a serving cell of mobile device 450. In various embodiments, the CRS overhead for the reference resource may comprise a number of REs corresponding to a number of CRS antenna ports associated with a PDSCH RE mapping and quasi-location indicator (PQI) state with a lowest index value. In some embodiments, the CRS overhead for the reference resource may comprise a number of REs corresponding to a number of CRS antenna ports associated with a non-zero power (NZP) CSI-RS for a CSI process of mobile device 450. The embodiments are not limited in this context.

In various embodiments, apparatus 400 and/or system 440 may comprise a selection component 424. Selection component 424 may comprise logic, circuitry, and/or instructions operative to select a modulation and coding scheme (MCS) for transmission of message 435 to mobile device 450 over downlink channel 412. In some 3GPP Rel-11 embodiments, message 435 may comprise UE data in one or more PDSCH resource blocks. The embodiments are not limited in this context.

In various embodiments, selection component 424 may be operative to select the MCS based on channel quality index 406 on the downlink control channel overhead and/or the CRS overhead determined by determination component 414. For example, in some 3GPP Rel-11 embodiments, selection component 424 may be operative to select the MCS based on a determined EPDCCH overhead and a determined CRS overhead for PDSCH resource blocks to be used to transmit message 435. In various 3GPP Rel-11 embodiments, selection component 424 may be operative to compensate for a difference between a CRS overhead of the reference resource and a CRS overhead for the PDSCH resource blocks when selecting the MCS. In some such 3GPP Rel-11 embodiments, selection component 424 may be operative to compensate for a difference between a number of CRS REs in the reference resource and a number of CRS REs in each of the one or more PDSCH resource blocks. In various embodiments, channel quality index 406 may indicate a first MCS, and selection component 424 may be operative to either select the first MCS or to identify and select a second MCS based on the difference between the CRS overhead of the reference resource and the CRS overhead of the one or more PDSCH resource blocks, and/or based on the determined EPDCCH overhead. The embodiments are not limited in this context.

In some embodiments, communication component 408 may be operative to transmit message 435 to mobile device 450 via downlink channel 412. In various embodiments, communication component 408 may be operative to transmit message 435 using the MCS selected by selection component 424 for one or more resource blocks of downlink channel 412. In some embodiments, communication component 408 may be operative to transmit message 435 as data within one or more REs of the one or more resource blocks. The embodiments are not limited in this context.

Figure 5:
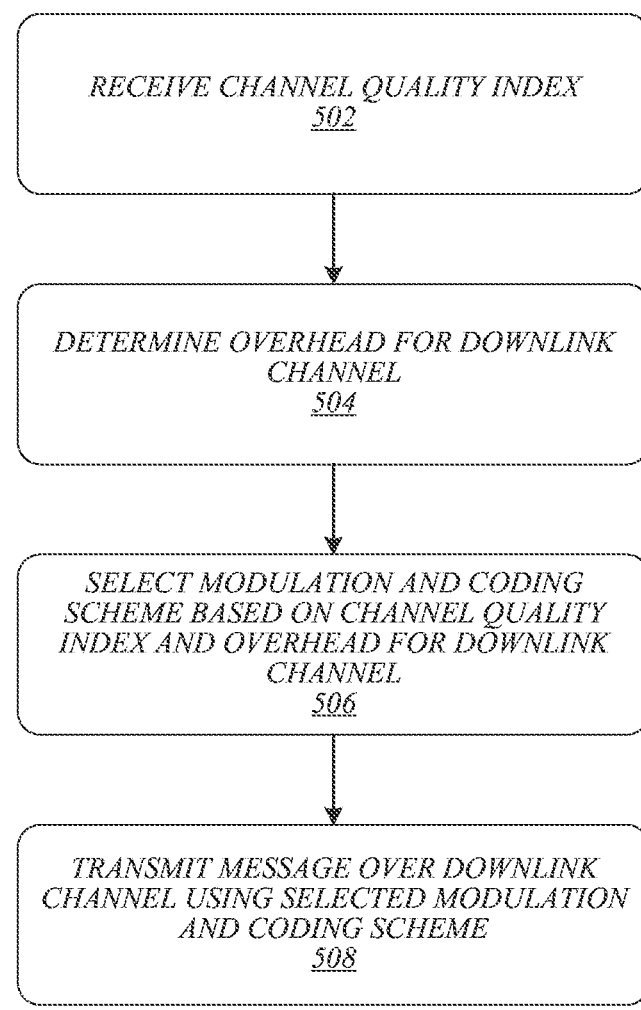
FIG. 5 illustrates one embodiment of a second logic flow.

FIG. 5 illustrates one embodiment of a logic flow 500, which may be representative of the operations executed by one or more embodiments described herein. More particularly, logic flow 500 may comprise an example of operations that apparatus 400 and/or system 440 of FIG. 4 may perform in conjunction with selection of a modulation and coding scheme for transmission of message 435. As shown in FIG. 5, a channel quality index may be received at 502. For example, communication component 408 of FIG. 4 may be operative to receive channel quality index 406 from mobile device 450 over uplink channel 420. At 504, an overhead may be determined for a downlink channel. For example, determination component 414 of FIG. 4 may be operative to determine an overhead for one or more resource blocks of downlink channel 412. In various embodiments, the overhead may include overhead associated with implementation of an downlink control channel within the downlink channel. In some embodiments, the overhead may additionally or alternatively include a CRS overhead for the one or more resource blocks of the downlink channel. The embodiments are not limited in this context.

At 506, a modulation and coding scheme may be selected based on the channel quality index and the overhead for the downlink channel. For example, selection component 424 of FIG. 4 may be operative to select a modulation and coding scheme for use in transmitting message 435, based on channel quality index 406 and on the overhead determined by determination component 414. At 508, a message may be transmitted over the downlink channel using the selected modulation and coding scheme. For example, communication component 408 of FIG. 4 may be operative to transmit message 435 to mobile device 450 via one or more resource blocks of downlink channel 412. The embodiments are not limited to these examples.

Figure 6:
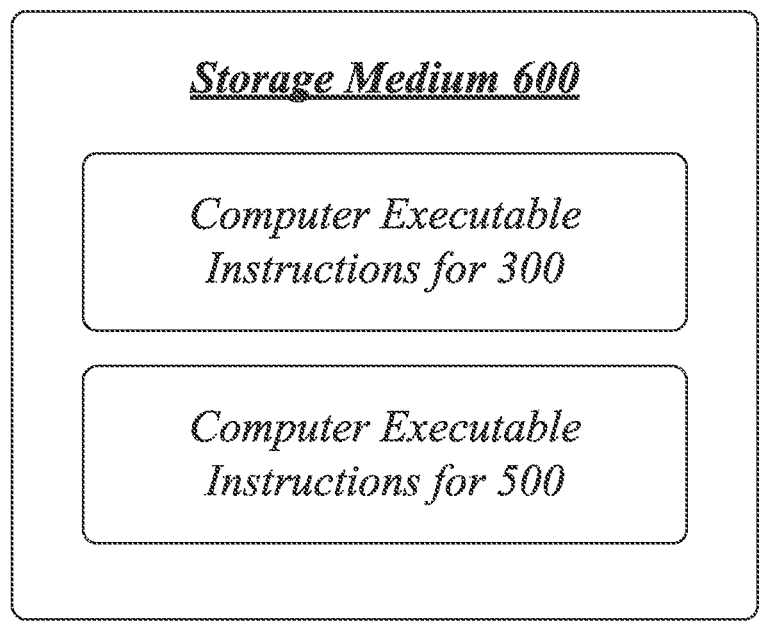
FIG. 6 illustrates one embodiment of a storage medium.

FIG. 6 illustrates an embodiment of a storage medium 600. The storage medium 600 may comprise an article of manufacture. In one embodiment, the storage medium 600 may comprise any non-transitory computer readable medium or machine readable medium, such as an optical, magnetic or semiconductor storage. The storage medium may store various types of computer executable instructions, such as instructions to implement one or more of logic flows 300 and 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
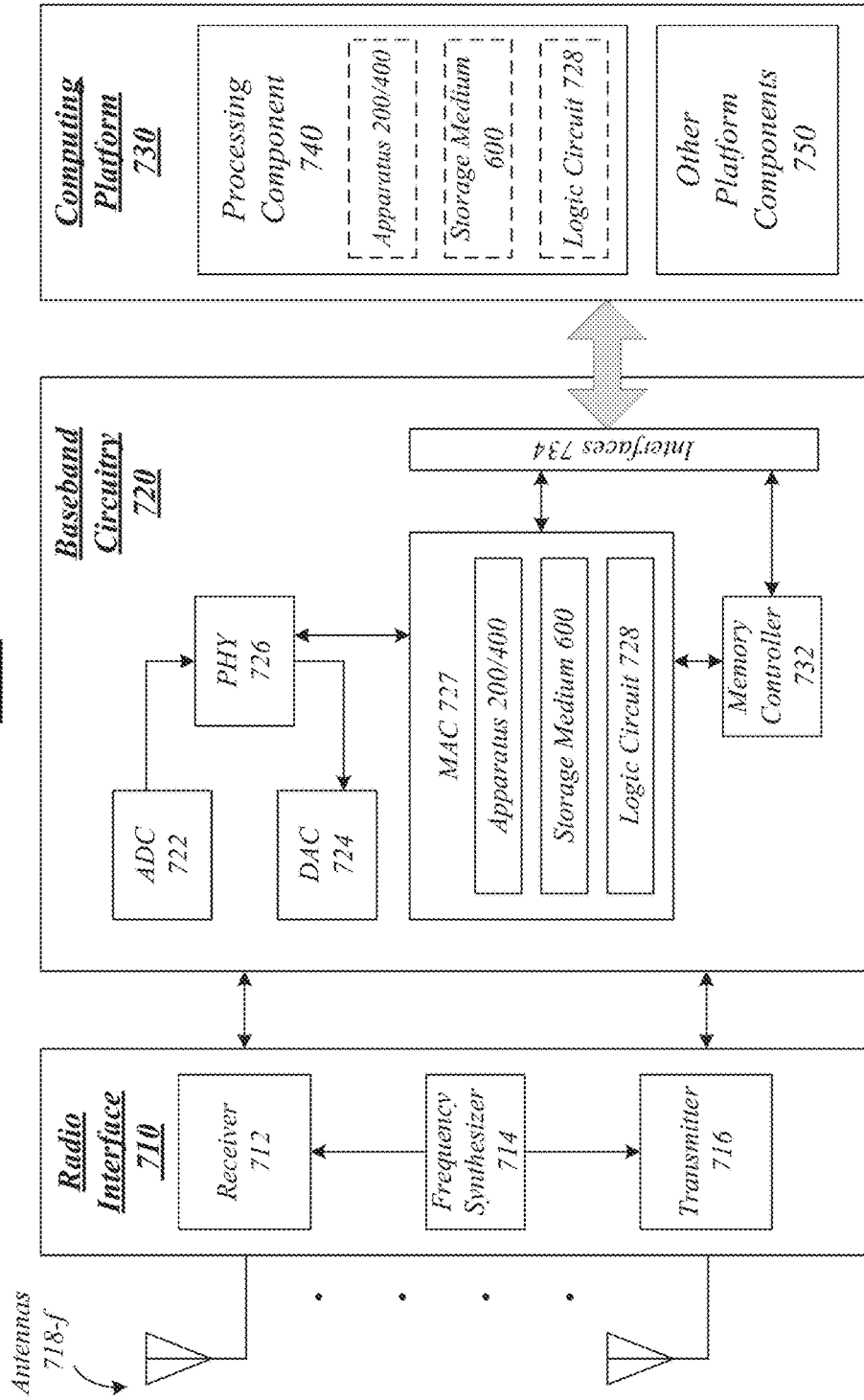
FIG. 7 illustrates one embodiment of a computing architecture.

FIG. 7 illustrates an embodiment of a device 700 for use in a broadband wireless access network. Device 700 may implement, for example, apparatus 200, system 240, apparatus 400, system 440, storage medium 600 and/or a logic circuit 728. The logic circuit 728 may include physical circuits to perform operations described for apparatus 200 or apparatus 400, for example. As shown in FIG. 7, device 700 may include a radio interface 710, baseband circuitry 720, and computing platform 730, although the embodiments are not limited to this configuration.

The device 700 may implement some or all of the structure and/or operations for the apparatus 200, system 240, apparatus 400, system 440, storage medium 600, and/or logic circuit 728 in a single computing entity, such as entirely within a single device. Alternatively, the device 700 may distribute portions of the structure and/or operations for the apparatus 200, system 240, apparatus 400, system 440, storage medium 600, and/or logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-$f$. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames and/or packets. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for the apparatus 200, system 240, apparatus 400, system 440, storage medium 600, and/or logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits (e.g., processor circuit 102), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 812, 818 are capable of coupling with base stations (BS) (or eNodeBs) 814, 820, respectively, to provide wireless communication between one or more fixed devices 816 and internet 810 and/or between one or one or more mobile devices 822 and Internet 810. One example of a fixed device 816 and a mobile device 822 is device 700, with the fixed device 816 comprising a stationary version of device 700 and the mobile device 822 comprising a mobile version of device 700. ASNs 812, 818 may implement profiles that are capable of defining the mapping of network functions to one or more physical entities on broadband wireless access system 800. Base stations (or eNodeBs) 814, 820 may comprise radio equipment to provide RF communication with fixed device 816 and/or mobile device 822, such as described with reference to device 700, and may comprise, for example, the PHY and MAC layer equipment in compliance with a 3GPP LTE Specification or an IEEE 802.16 Standard. Base stations (or eNodeBs) 814, 820 may further comprise an IP backplane to couple to Internet 810 via ASNs 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 824 may be referred to as a visited CSN in the case where visited CSN 824 is not part of the regular service provider of fixed device 816 or mobile device 822, for example where fixed device 816 or mobile device 822 is roaming away from its respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations (or eNodeBs) 814, 820, such as in or near a home or business to provide home or business customer broadband access to Internet 810 via base stations (or eNodeBs) 814, 820 and ASNs 812, 818, respectively, and home CSN 826. It is worthy of note that although fixed device 816 is generally disposed in a stationary location, it may be moved to different locations as needed. Mobile device 822 may be utilized at one or more locations if mobile device 822 is within range of one or both base stations (or eNodeBs) 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising processing circuitry, a determination component for execution on the processing circuitry to determine a received quality parameter for a channel state information (CSI) reference signal of a downlink channel and define a CSI reference resource for the downlink channel, the determination component to define the CSI reference resource to include one or more resource elements (REs) allocated to a downlink control channel implemented within the downlink channel, and a selection component for execution on the processing circuitry to select a channel quality indicator (CQI) index based on the received quality parameter and the CSI reference resource.

In Example 2, the downlink channel of Example 1 may optionally comprise a physical downlink shared channel (PDSCH), and the downlink control channel may optionally comprise an enhanced physical downlink control channel (EPDCCH).

In Example 3, the UE of Example 2 may optionally be configured with one or more EPDCCH physical resource block (PRB) sets, and the determination component may optionally define the CSI reference resource based on the one or more EPDCCH PRB sets.

In Example 4, the selection component of any one of Examples 1 to 3 may optionally define the CSI reference resource to include one or more REs comprising cell-specific reference signal (CRS) overhead.

In Example 5, the CQI index of any one of Examples 1 to 4 may optionally identify a modulation and coding scheme (MCS) for transmission of a message to the UE over the downlink channel.

In Example 6, the received quality parameter of any one of Examples 1 to 5 may optionally comprise channel measurements for a CSI reference signal (CSI-RS) and interference measurements for a CSI interference measurement (CSI-IM) resource.

In Example 7, the UE of any one of Examples 1 to 6 may optionally comprise a display, a radio frequency (RF) transceiver, and one or more RF antennas.

Example 8 is a wireless communications method, comprising receiving, at user equipment (UE), a channel state information (CSI) reference signal (CSI-RS) and a CSI interference measurement (CSI-IM) resource, calculating, by a processor, a channel measurement for the CSI-RS and an interference measurement for the CSI-IM resource, defining a reference resource for a physical downlink shared channel (PDSCH) to include a set of cell-specific reference signal (CRS) overhead resource elements (REs), and selecting a CQI index based on the channel measurement, the interference measurement, and the reference resource.

In Example 9, the wireless communications method of Example 8 may optionally comprise defining the reference resource such that the set of CRS overhead REs comprises a number of REs corresponding to a number of CRS antenna ports configured for a serving cell of the UE.

In Example 10, the wireless communications method of Example 8 may optionally comprise defining the reference resource such that the set of CRS overhead REs comprises a number of REs corresponding to a number of CRS antenna ports associated with a PDSCH RE mapping and quasi-location indicator (PQI) state with a lowest index value.

In Example 11, the wireless communications method of Example 8 may optionally comprise defining the reference resource such that the set of CRS overhead REs comprises a number of REs corresponding to a number of CRS antenna ports associated with a non-zero power (NZP) CSI-RS for a CSI process of the UE.

In Example 12, the wireless communications method of any one of Examples 8 to 11 may optionally comprise defining the reference resource to include one or more REs allocated to an enhanced physical downlink control channel (EPDCCH).

In Example 13, the CQI index of any one of Examples 8 to 12 may optionally indicate a modulation and coding scheme (MCS) for transmission of data to the UE in one or more PDSCH resource blocks.

Example 14 is at least one machine-readable medium comprising a set of instructions that, in response to being executed on a computing device, cause the computing device to perform a wireless communications method according to any one of Examples 8 to 13.

Example 15 is an apparatus, comprising means for performing a wireless communications method according to any one of Examples 8 to 13.

Example 16 is an evolved node B (eNB), comprising a processor circuit, a communication component for execution by the processor circuit to receive a channel quality index for a physical downlink shared channel (PDSCH), the channel quality index associated with a defined reference resource, and a selection component for execution by the processor circuit to select a modulation and coding scheme (MCS) for transmission over the PDSCH of user equipment (UE) data in one or more resource blocks, the selection component to compensate for a difference between a cell-specific reference signal (CRS) overhead of the defined reference resource and a CRS overhead of the one or more resource blocks when selecting the MCS.

In Example 17, the selection component of Example 16 may optionally be for execution by the processor circuit to compensate for a difference between a number of CRS resource elements (REs) in the defined reference resource and a number of CRS REs in each of the one or more resource blocks.

In Example 18, the channel quality index of any one of Examples 16 to 17 may optionally indicate a first MCS, and the selection component may optionally be for execution by the processor circuit to either select the first MCS or identify and select a second MCS based on the difference between the CRS overhead of the defined reference resource and the CRS overhead of the one or more resource blocks.

In Example 19, the selection component of any one of Examples 16 to 18 may optionally be for execution by the processor circuit to compensate for an enhanced physical downlink control channel (EPDCCH) implemented within the PDSCH when selecting the MCS.

In Example 20, the CRS overhead of the one or more resource blocks of any one of Examples 16 to 19 may optionally correspond to a number of CRS antenna ports used by the eNB.

In Example 21, the channel quality index of any one of Examples 16 to 20 may optionally comprise a channel quality indicator (CQI) index.

In Example 22, the defined reference resource of any one of Examples 16 to 21 may optionally comprise a channel state information (CSI) reference resource.

Example 23 is at least one machine-readable medium comprising a set of wireless communications instructions that, in response to being executed on a computing device, cause the computing device to receive, at an evolved node B (eNB), a channel quality indicator (CQI) index for a physical downlink shared channel (PDSCH), determine an enhanced physical downlink control channel (EPDCCH) overhead of one or more resource blocks of the PDSCH, and select a modulation and coding scheme (MCS) for transmission of a message via the one or more resource blocks based on the CQI index and the EPDCCH overhead.

In Example 24, the EPDCCH overhead of Example 23 may optionally correspond to one or more EPDCCH physical resource block (PRB) sets configured for the PDSCH.

In Example 25, the at least one machine-readable medium of any one of Examples 23 to 24 may optionally comprise wireless communications instructions that, in response to being executed on the computing device, cause the computing device to transmit the message via a set of resource elements (REs) in the one or more resource blocks.

In Example 26, the CQI index of any one of Examples 23 to 25 may optionally correspond to a channel state information (CSI) reference resource defined to comprise no EPDCCH overhead.

In Example 27, the at least one machine-readable medium of any one of Examples 23 to 26 may optionally comprise wireless communications instructions that, in response to being executed on the computing device, cause the computing device to determine a cell-specific reference signal (CRS) overhead of the one or more resource blocks, and select the MCS based on the CQI index, the EPDCCH overhead, and the CRS overhead.

Example 28 is a wireless communications method, comprising determining, by a processor circuit at user equipment (UE), a received quality parameter for a channel state information (CSI) reference signal of a downlink channel, defining a CSI reference resource for the downlink channel, the CSI reference resource to include one or more resource elements (REs) allocated to a downlink control channel implemented within the downlink channel, and selecting a channel quality indicator (CQI) index based on the received quality parameter and the CSI reference resource.

In Example 29, the downlink channel of Example 28 may optionally comprise a physical downlink shared channel (PDSCH), and the downlink control channel may optionally comprise an enhanced physical downlink control channel (EPDCCH).

In Example 30, the wireless communications method of Example 29 may optionally comprise defining the CSI reference resource based on one or more EPDCCH physical resource block (PRB) sets with which the UE is configured.

In Example 31, the wireless communications method of any one of Examples 28 to 30 may optionally comprise defining the CSI reference resource to include one or more REs comprising cell-specific reference signal (CRS) overhead.

In Example 32, the CQI index of any one of Examples 28 to 31 may optionally identify a modulation and coding scheme (MCS) for transmission of a message to the UE over the downlink channel.

In Example 33, the received quality parameter of any one of Examples 28 to 32 may optionally comprise channel measurements for a CSI reference signal (CSI-RS) and interference measurements for a CSI interference measurement (CSI-IM) resource.

Example 34 is at least one machine-readable medium comprising a set of instructions that, in response to being executed on a computing device, cause the computing device to perform a wireless communications method according to any one of Examples 28 to 33.

Example 35 is an apparatus, comprising means for performing a wireless communications method according to any one of Examples 28 to 33.

Example 36 is user equipment (UE), comprising a processor, a determination component for execution by the processor to receive a channel state information (CSI) reference signal (CSI-RS) and a CSI interference measurement (CSI-IM) resource, calculate a channel measurement for the CSI-RS and an interference measurement for the CSI-IM resource, and define a reference resource for a physical downlink shared channel (PDSCH) to include a set of cell-specific reference signal (CRS) overhead resource elements (REs), and a selection component for execution by the processor to select a CQI index based on the channel measurement, the interference measurement, and the reference resource.

In Example 37, the determination component of Example 36 may optionally be for execution by the processor to define the reference resource such that the set of CRS overhead REs comprises a number of REs corresponding to a number of CRS antenna ports configured for a serving cell of the UE.

In Example 38, the determination component of Example 36 may optionally be for execution by the processor to define the reference resource such that the set of CRS overhead REs comprises a number of REs corresponding to a number of CRS antenna ports associated with a PDSCH RE mapping and quasi-location indicator (PQI) state with a lowest index value.

In Example 39, the determination component of Example 36 may optionally be for execution by the processor to define the reference resource such that the set of CRS overhead REs comprises a number of REs corresponding to a number of CRS antenna ports associated with a non-zero power (NZP) CSI-RS for a CSI process of the UE.

In Example 40, the determination component of any one of Examples 36 to 39 may optionally be for execution by the processor to define the reference resource to include one or more REs allocated to an enhanced physical downlink control channel (EPDCCH).

In Example 41, the CQI index of any one of Examples 36 to 40 may optionally indicate a modulation and coding scheme (MCS) for transmission of data to the UE in one or more PDSCH resource blocks.

Example 42 is a wireless communications method, comprising receiving, at an evolved node B (eNB), a channel quality index for a physical downlink shared channel (PDSCH), the channel quality index associated with a defined reference resource, selecting, by a processor circuit, a modulation and coding scheme (MCS) for transmission over the PDSCH of user equipment (UE) data in one or more resource blocks, and compensating for a difference between a cell-specific reference signal (CRS) overhead of the defined reference resource and a CRS overhead of the one or more resource blocks when selecting the MCS.

In Example 43, the wireless communications method of Example 42 may optionally comprise compensating for a difference between a number of CRS resource elements (REs) in the defined reference resource and a number of CRS REs in each of the one or more resource blocks.

In Example 44, the channel quality index of any one of Examples 42 to 43 may optionally indicate a first MCS, and the wireless communications method may optionally comprise either selecting a first MCS indicated by the channel quality index or identifying and selecting a second MCS based on the difference between the CRS overhead of the defined reference resource and the CRS overhead of the one or more resource blocks.

In Example 45, the wireless communications method of any one of Examples 42 to 44 may optionally comprise compensating for an enhanced physical downlink control channel (EPDCCH) implemented within the PDSCH when selecting the MCS.

In Example 46, the CRS overhead of the one or more resource blocks of any one of Examples 42 to 45 may optionally correspond to a number of CRS antenna ports used by the eNB.

In Example 47, the channel quality index of any one of Examples 42 to 46 may optionally comprise a channel quality indicator (CQI) index.

In Example 48, the defined reference resource of any one of Examples 42 to 47 may optionally comprise a channel state information (CSI) reference resource.

Example 49 is at least one machine-readable medium comprising a set of instructions that, in response to being executed on a computing device, cause the computing device to perform a wireless communications method according to any one of Examples 42 to 48.

Example 50 is an apparatus, comprising means for performing a wireless communications method according to any one of Examples 42 to 48.

Example 51 is an evolved node B (eNB), comprising a processor circuit, a communication component for execution by the processor circuit to receive a channel quality indicator (CQI) index for a physical downlink shared channel (PDSCH), a determination component for execution by the processor circuit to determine an enhanced physical downlink control channel (EPDCCH) overhead of one or more resource blocks of the PDSCH, and a selection component for execution by the processor circuit to select a modulation and coding scheme (MCS) for transmission of a message via the one or more resource blocks based on the CQI index and the EPDCCH overhead.

In Example 52, the EPDCCH overhead of Example 51 may optionally correspond to one or more EPDCCH physical resource block (PRB) sets configured for the PDSCH.

In Example 53, the communication component of any one of Examples 51 to 52 may optionally be for execution by the processor circuit to transmit the message via a set of resource elements (REs) in the one or more resource blocks.

In Example 54, the CQI index of any one of Examples 51 to 53 may optionally correspond to a channel state information (CSI) reference resource defined to comprise no EPDCCH overhead.

In Example 55, the determination component of any one of Examples 51 to 54 may optionally be for execution by the processor circuit to determine a cell-specific reference signal (CRS) overhead of the one or more resource blocks, and the selection component may optionally be for execution by the processor circuit to select the MCS based on the CQI index, the EPDCCH overhead, and the CRS overhead.

In Example 56, the eNB of any one of Examples 51 to 55 may optionally comprise a display, a radio frequency (RF) transceiver, and one or more RF antennas.

Example 57 is a wireless communications method, comprising receiving, at an evolved node B (eNB), a channel quality indicator (CQI) index for a physical downlink shared channel (PDSCH), determining, by a processor circuit, an enhanced physical downlink control channel (EPDCCH) overhead of one or more resource blocks of the PDSCH, and selecting a modulation and coding scheme (MCS) for transmission of a message via the one or more resource blocks based on the CQI index and the EPDCCH overhead.

In Example 58, the EPDCCH overhead of Example 57 may optionally correspond to one or more EPDCCH physical resource block (PRB) sets configured for the PDSCH.

In Example 59, the wireless communications method of any one of Examples 57 to 58 may optionally comprise transmitting the message via a set of resource elements (REs) in the one or more resource blocks.

In Example 60, the CQI index of any one of Examples 57 to 59 may optionally correspond to a channel state information (CSI) reference resource defined to comprise no EPDCCH overhead.

In Example 61, the wireless communications method of any one of Examples 57 to 60 may optionally comprise determining a cell-specific reference signal (CRS) overhead of the one or more resource blocks, and selecting the MCS based on the CQI index, the EPDCCH overhead, and the CRS overhead.

Example 62 is at least one machine-readable medium comprising a set of instructions that, in response to being executed on a computing device, cause the computing device to perform a wireless communications method according to any one of Examples 57 to 61.

Example 63 is an apparatus, comprising means for performing a wireless communications method according to any one of Examples 57 to 61.

Example 64 is user equipment (UE), comprising a processor circuit to derive a channel quality indicator (CQI) index for a reference resource of a shared wireless downlink channel for an orthogonal frequency-division multiple access (OFDMA) system, wherein the CQI index is derived without reference to elements in the reference resource used by an enhanced downlink control channel, and a radio-frequency (RF) transmitter coupled to the processor circuit, the RF transmitter to transmit electromagnetic signals representing the CQI index on a wireless uplink channel.

In Example 65, the CQI index of Example 64 may optionally comprise channel state information (CSI) for a serving cell of the UE.

In Example 66, the reference resource of any one of Examples 64 to 65 may optionally comprise a channel state information (CSI) reference resource defined in a frequency domain by a group of downlink physical resource blocks corresponding to a band to which the CQI index relates.

In Example 67, the CQI index of any one of Examples 64 to 66 may optionally be derived with the reference resource having a first three orthogonal frequency-division multiplexing (OFDM) symbols occupied by control signals.

In Example 68, the reference resource of any one of Examples 64 to 67 may optionally comprise a channel state information (CSI) reference resource defined in a time domain by a single downlink subframe.

In Example 69, the processor circuit of any one of Examples 64 to 68 may optionally configure a channel state information (CSI) process to report CSI comprising the CQI index, a precoding matrix indicator (PMI) and a rank indication (RI).

In Example 70, the shared wireless downlink channel of any one of Examples 64 to 69 may optionally comprise a physical downlink shared channel (PDSCH).

In Example 71, the UE of any one of Examples 64 to 70 may optionally comprise one or more RF antennas coupled to the RF transmitter.

In Example 72, the UE of any one of Examples 64 to 71 may optionally comprise a touchscreen display.

Example 73 is user equipment (UE), comprising a processor circuit to configure a channel state information (CSI) process to report a precoding matrix indicator (PMI), a rank indication (RI), and a channel quality indicator (CQI) index for a CSI reference resource of a downlink shared channel, the processor circuit to derive the CQI index for the CSI reference resource using a parameter where a cell-specific reference signal (CRS) overhead of the CSI reference resource is a same value as a CRS overhead corresponding to a number of CRS antenna ports of a serving cell of the UE.

In Example 74, the downlink shared channel of Example 73 may optionally comprise a physical downlink shared channel (PDSCH).

In Example 75, the CSI reference resource of any one of Examples 73 to 74 may optionally be defined in a time domain by a single downlink subframe.

In Example 76, the CSI reference resource of any one of Examples 73 to 75 may optionally be defined in a frequency domain by a group of downlink physical resource blocks corresponding to a band to which the CQI index relates.

In Example 77, the processor circuit of any one of Examples 73 to 76 may optionally configure the CSI process to report CSI for a serving cell of the UE, and the CSI may optionally comprise the CQI index, the PMI, and the RI.

In Example 78, the processor circuit of any one of Examples 73 to 77 may optionally derive the CQI index based on an assumption that no elements in the CSI reference resource are used by an enhanced physical downlink control channel (EPDCCH).

In Example 79, the UE of any one of Examples 73 to 78 may optionally comprise a transceiver coupled to one or more radio frequency (RF) antennas to transmit the CQI index.

In Example 80, the UE of any one of Examples 73 to 79 may optionally comprise a user input device.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
a radio frequency (RF) receiver to receive a channel state information (CSI) reference signal (CSI-RS);
circuitry coupled to the RF receiver, the circuitry to derive a channel quality indicator (CQI) index for a frequency band of an orthogonal frequency-division multiple access (OFDMA) wireless communication system, the circuitry to derive the CQI index based on the CSI-RS and a CSI reference resource of a shared wireless downlink channel, a first three orthogonal frequency-division multiplexing (OFDM) symbols of the CSI reference resource to be occupied by control signals; and
an RF transmitter coupled to the circuitry, the RF transmitter to transmit electromagnetic signals representing the CQI index on a wireless uplink channel.

2. The UE of claim 1, the CQI index comprising CSI for a serving cell of the UE.

3. The UE of claim 1, the CSI reference resource defined in a frequency domain by a group of downlink physical resource blocks corresponding to the frequency band.

4. The UE of claim 1, the circuitry to derive the CQI index without reference to resource elements of the CSI reference resource that are allocated to an enhanced physical downlink control channel (EPDCCH).

5. The UE of claim 1, the CSI reference resource defined in a time domain by a single downlink subframe.

6. The UE of claim 1, the circuitry to configure a CSI process to report CSI comprising the CQI index, a precoding matrix indicator (PMI) and a rank indication (RI).

7. The UE of claim 1, the shared wireless downlink channel comprising a physical downlink shared channel (PDSCH).

8. The UE of claim 1, comprising one or more RF antennas coupled to the RF transmitter.

9. The UE of claim 1, comprising a touchscreen display.

10. User equipment (UE), comprising:
a radio frequency (RF) receiver to receive a channel state information (CSI) reference signal (CSI-RS);
circuitry coupled to the RF receiver, the circuitry to configure a channel state information (CSI) process to report a precoding matrix indicator (PMI), a rank indication (RI), and a channel quality indicator (CQI) index for an orthogonal frequency-division multiple access (OFDMA) frequency band, the circuitry to derive the CQI index based on the CSI-RS, a CSI interference measurement (CSI-IM) resource, and a CSI reference resource of a downlink shared channel, the circuitry to derive the CQI index based on an assumption that no resource elements of the CSI reference resource are allocated to an enhanced physical downlink control channel (EPDCCH) or a physical broadcast channel (PBCH); and an RF transmitter coupled to the circuitry, the RF transmitter to transmit the CQI index over a wireless uplink channel.

11. The UE of claim 10, the downlink shared channel comprising a physical downlink shared channel (PDSCH).

12. The UE of claim 10, the CSI reference resource defined in a time domain by a single downlink subframe.

13. The UE of claim 10, the CSI reference resource defined in a frequency domain by a group of downlink physical resource blocks corresponding to the OFDMA frequency band.

14. The UE of claim 10, the circuitry to configure the CSI process to report CSI for a serving cell of the UE, the CSI comprising the CQI index, the PMI, and the RI.

15. The UE of claim 10, the CSI reference resource to comprise a same cell-specific reference signal (CRS) overhead as a CRS overhead corresponding to a number of CRS antenna ports of a serving cell of the UE.

16. The UE of claim 10, comprising one or more RF antennas coupled to the RF transceiver.

17. The UE of claim 10, comprising a user input device.

18. At least one non-transitory computer-readable storage medium comprising a set of instructions that, in response to being executed on user equipment (UE), cause the UE to:
  access a channel state information (CSI) reference signal (CSI-RS);
  derive a channel quality indicator (CQI) index for a frequency band of an orthogonal frequency-division multiple access (OFDMA) wireless communication system, the circuitry to derive the CQI index based on the CSI-RS and a CSI reference resource of a shared wireless downlink channel, a first three orthogonal frequency-division multiplexing (OFDM) symbols of the CSI reference resource to be occupied by control signals; and
  initiate transmission of electromagnetic signals representing the CQI index on a wireless uplink channel.

19. The at least one non-transitory computer-readable storage medium of claim 18, the CQI index comprising CSI for a serving cell of the UE.

20. The at least one non-transitory computer-readable storage medium of claim 18, the CSI reference resource defined in a frequency domain by a group of downlink physical resource blocks corresponding to the frequency band.

21. The at least one non-transitory computer-readable storage medium of claim 18, further comprising instructions to derive the CQI index without reference to resource elements of the CSI reference resource that are allocated to an enhanced physical downlink control channel (EPDCCH).

22. The at least one non-transitory computer-readable storage medium of claim 18, the CSI reference resource defined in a time domain by a single downlink subframe.

23. The at least one non-transitory computer-readable storage medium of claim 18, further comprising instructions to configure a CSI process to report CSI comprising the CQI index, a precoding matrix indicator (PMI) and a rank indication (RI).

24. The at least one non-transitory computer-readable storage medium of claim 18, the shared wireless downlink channel comprising a physical downlink shared channel (PDSCH).

25. The at least one non-transitory computer-readable storage medium of claim 18, further comprising instructions to derive the CQI index based on the CSI-RS, a CSI interference measurement (CSI-IM) resource, and the CSI reference resource of the shared wireless downlink channel.

* * * * *